United States Patent [19]

Weissler, II

[11] 4,165,650

[45] Aug. 28, 1979

[54] DUAL PURPOSE PRESSURE SENSOR

[75] Inventor: Harold E. Weissler, II, Newport News, Va.

[73] Assignee: The Bendix Corporation, Southfield, Mich.

[21] Appl. No.: 925,920

[22] Filed: Jul. 19, 1978

[51] Int. Cl.² .................. G01L 7/00; G01M 15/00
[52] U.S. Cl. .................................... 73/700; 73/115; 73/753; 123/32 EA
[58] Field of Search ............... 73/119 A, 115, 700, 73/753; 364/431; 123/117 A, 32 EA

[56] References Cited
U.S. PATENT DOCUMENTS

| 3,286,528 | 11/1966 | Jullien-Davin | 73/728 |
| 3,382,470 | 5/1968 | Kvistad | 336/30 |
| 3,738,339 | 6/1973 | Huntzinger et al. | 123/117 A |
| 3,750,474 | 8/1973 | Pollock | 73/386 |
| 3,845,348 | 10/1974 | Riley | 318/619 |
| 4,038,532 | 7/1977 | Burris et al. | 235/151.3 |

Primary Examiner—Donald O. Woodiel
Attorney, Agent, or Firm—Gaylord P. Hass, Jr.; Russel C. Wells; William G. Christoforo

[57] ABSTRACT

A single pressure sensor is caused to provide a pressure measurement at two separate pressure regions through the use of a differential pressure switch whose switch over point occurs when the two regions are at a fixed pressure differential or offset. The sensor is connected to sense a first region with a sensor output signal being compared to a signal related to the count in a counter. Upon switch over the counter is actuated to make a signal equal to the sensor output signal. The counter signal, compensated for the offset, is related to the pressure at the second region.

14 Claims, 3 Drawing Figures

DUAL PURPOSE PRESSURE SENSOR

FIELD OF THE INVENTION

This invention relates to means for use with a single fluid pressure sensor/transducer by causing the sensor to provide signals proportional to the fluid pressures at two separate regions. More particularly, the invention relates to means for use with the manifold absolute pressure sensor of an electronic fuel injection system for internal combustion engines to permit signals related to both manifold absolute pressure and atmospheric pressure to be obtained.

BACKGROUND OF THE INVENTION

In electronic fuel injection systems for internal combustion engines both manifold absolute pressure and atmospheric pressure, inter alia, are required by the system logic in calculating the proper injector open time for effective and efficient engine operation. Accordingly, one pressure sensor or transducer is provided in the engine manifold to sense manifold absolute pressure and generate a signal proportional thereto and a second sensor or transducer is provided to sense atmospheric pressure and generate a signal proportional thereto.

Since pressure sensors are relatively expensive, means for using a single pressure sensor to sense both manifold absolute pressure and absolute pressure have been devised. One such means has involved the use of solenoid valves disposed between each pressure region to be measured and a pressure sensor so that the pressure sensor can be time shared. Another means has involved the use of a differential pressure switch connected across the engine manifold and the atmosphere and arranged so that switch over occurs at a predetermined pressure differential. A pressure sensor is provided to sense the manifold absolute pressure. Upon switch over the signal from the manifold absolute pressure sensor is sampled and the offset added to the sampled signal to provide a signal related to absolute pressure.

SUMMARY OF THE INVENTION

The present invention is an improvement over the last mentioned means above. The present invention permits a measurement of atmospheric pressure to be made when the engine ignition is initially turned on and thereafter at relatively frequent intervals during engine operation. The invention is comprised of a manifold absolute pressure sensor or transducer which generates an electrical signal proportional to manifold absolute pressure, a pressure switch connected between the manifold and atmosphere which closes (or optionally opens) when the manifold absolute pressure is equal or less than the ambient pressure by the pressure switch offset, and an electronic circuit which samples the output of the manifold absolute pressure transducer when the pressure switch closes (or opens), holds the sampled signal, and adds back an offset equivalent to the pressure switch offset. The circuit also samples and holds the manifold absolute pressure signal without any offset when the engine ignition is first turned on, at which time power is first applied to the circuit. The pressure switch offset is selected to be in the normal operating range of the engine so that the ambient pressure is sampled often.

The electronic sampling circuit is comprised of an up-down counter driven from a clock and which in turn drives a digital-to-analog converter. The output signal from the digital-to-analog converter is scaled and offset to the ambient pressure range of interest minus the pressure switch offset. This signal is fed in parallel to a first comparator and an amplifier which adds the pressure switch offset to the signal. The signal with the pressure switch offset added feeds, in parallel, a second comparator and an ambient pressure signal output terminal. The other input to both the first and second comparators is the signal from the manifold absolute pressure sensor.

When power is first applied to the electronic circuit, normally when the engine ignition is turned on, an initial turn on signal is generated which activates a clock which drives the up-down counter, and enables the second comparator to control the up-down signal to the counter so that the signal at the ambient pressure signal output terminal approaches the instantaneous value of the manifold absolute pressure signal. Once the ambient pressure signal reaches the manifold absolute pressure signal level the second comparator switches the direction of the counter so as to maintain the ambient pressure signal near the manifold absolute pressure signal. After a predetermined time the initial turn-on signal terminates, the second comparator is thereby disabled so long as the electronic circuit continues to be energized, and the clock to the counter is disabled. Thus, when power is initially applied to the circuit and before the engine has been started the manifold absolute pressure signal has been sampled and the ambient pressure signal set at its proper value.

Under normal engine operating conditions the first comparator controls the up-down direction of the counter. When a pressure switch closure (or opening) is detected, the clock to the counter is enabled until the first comparator changes state. This causes the manifold absolute pressure to be sampled when it differs from ambient pressure by an amount equal to the pressure switch offset. The offset is electronically added back to the sampled signal and supplied to the ambient pressure output terminal as the ambient pressure signal. The clock frequency is chosen such that the counter and analog-to-digital converter can change states much faster than the manifold absolute pressure signal will vary.

It is thus an object of this invention to provide means which will permit a single pressure sensor to sense the pressure at two separate regions.

Another object of this invention is to provide means of the type described for use in an electronic fuel injection system for an internal combustion engine.

A further object of this invention is to provide means of the type described wherein one region comprises an internal combustion engine manifold and the other region comprises the ambient atmosphere.

One more object of this invention is to provide means of the type described having an electronic circuit which samples both manifold absolute pressure and ambient pressure upon initial circuit turn-on and thereafter samples the various pressures at relatively frequent intervals.

These and other objects of the invention will become apparent to one skilled in the art from a reading and understanding of the following description of the invention.

BACKGROUND OF THE INVENTION

Figure 1:
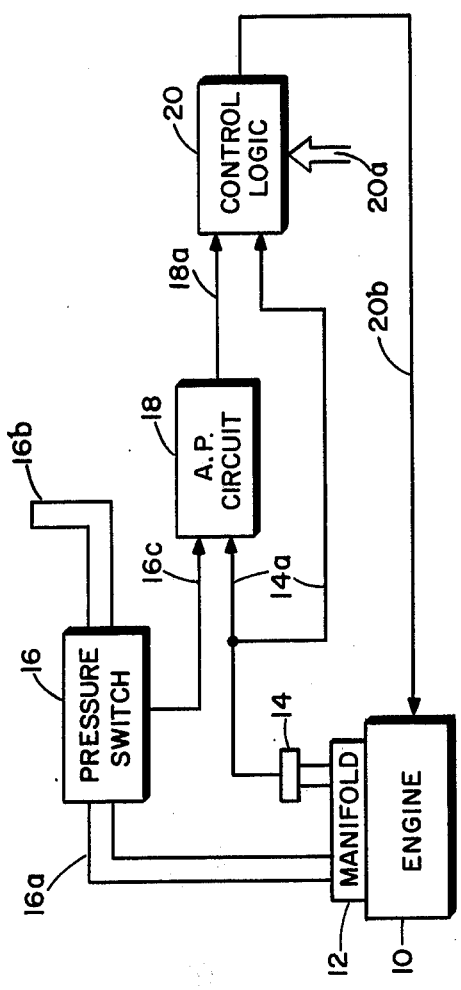
FIG. 1 is a simplified block diagram of an electronic fuel injection system for an internal combustion engine wherein an ambient pressure signal is obtained by the means of the present invention.

Referring first to FIG. 1 an internal combustion engine has a manifold 12 the pressure within which is sensed by a manifold absolute pressure sensor 14 which produces a signal proportional to the manifold absolute pressure on line 14a. The manifold absolute pressure signal is transmitted to an ambient pressure circuit 18 made in accordance with the principals of the present invention and also to a standard control logic circuit 20 of the type well known to those skilled in the electronic fuel injection art. Although the ambient pressure circuit is shown here, for clarity, separate from the control logic circuit, it is usual to combine the two in one electronic control unit. An offset differential pressure switch 16 is connected via tubulation 16a to sense manifold absolute pressure and via tubulation 16b to sense ambient pressure. As known to those skilled in the art, an offset differential pressure switch will switch-over when the differential pressure across the switch is equal to the offset. Hence, switch 16 switches over when the manifold absolute pressure is offset from the ambient pressure by the amount of the switch offset. Switch cross-overs are communicated to ambient pressure circuit 18 via line 16c.

As will be shown below, ambient pressure circuit 18 generates a signal related to ambient pressure at line 18a in response to the manifold absolute pressure signal and differential pressure switch switch-overs. The ambient pressure signal is applied to control logic 20 which in response thereto and to the manifold absolute pressure signal on line 14a and various other signal relating to parameters such as engine speed, throttle position, etc., of the type known to those skilled in the art, and as represented by arrow 20a, generates a control signal on line 20b which is applied to control the performance of engine 10. This control is normally exerted by controlling the time period during which engine fuel injectors are open to spray fuel into the manifold in proximity to the engine cylinder fuel intake valves.

Figure 2:
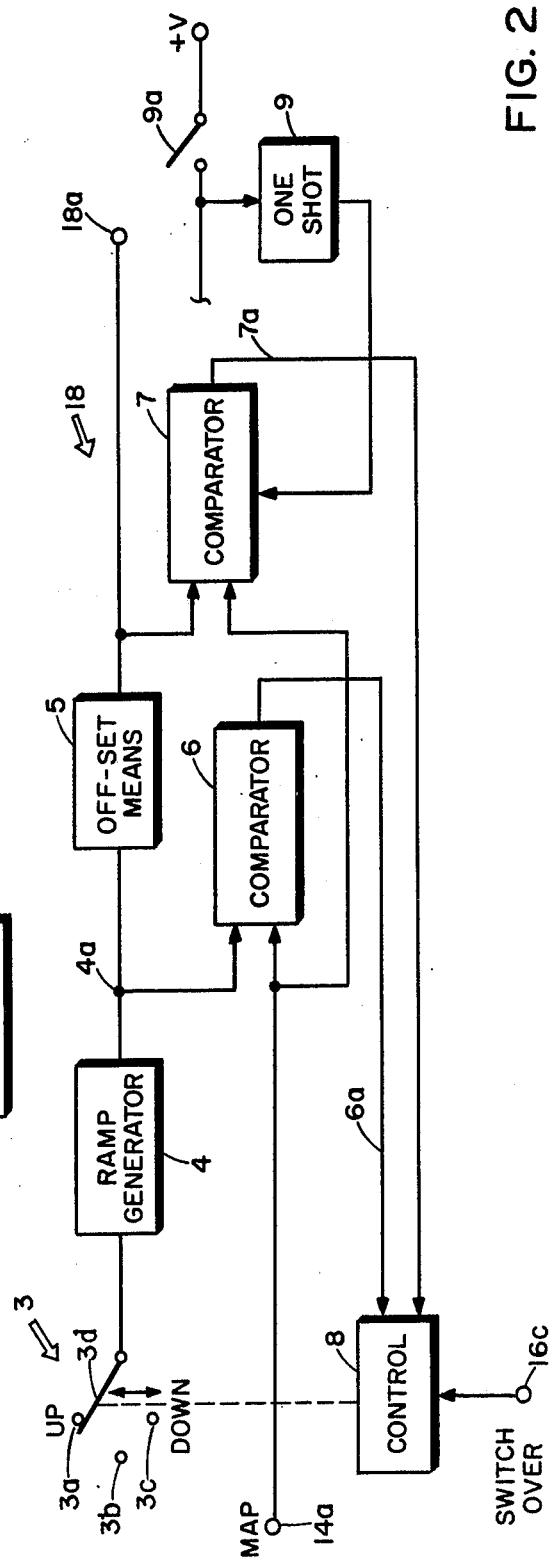
FIG. 2 is a block diagram of an embodiment of the invention.

Referring now to FIG. 2, a block diagram of the ambient pressure circuit 18 of FIG. 1, there is seen a ramp generator 4 which generates a ramping signal which ramps either upwards or downwards depending upon the state of a ramp direction control means here illustrated as switch 3, the ramping signal being generated at terminal 4a. Ramp generator 4 can be, for example, a charge storage circuit or the means shown in FIG. 3 below. The control means 3 is represented as having a switch arm 3d and an up contact 3a, a neutral contact 3b, and a down contact 3c. It should be clear when the switch is in the position shown the signal at terminal 4a will ramp upwards, when in the middle position the signal at terminal 4a will remain constant and when the switch is in the down position the signal at terminal 4a will ramp downwards.

The position of the device represented by switch 3 is controlled by a control circuit 8 in response to signals to be described below.

The signal at terminal 4a proceeds to offset means 5 wherein an offset equivalent to the offset of differential pressure switch 16 of FIG. 1 is applied, the resulting signal at terminal 18a being an electrical signal proportional to ambient pressure. The signal at terminal 4a is also compared against the manifold absolute pressure signal applied to terminal 14a in comparator 6. The signal at terminal 18a is compared against the manifold absolute pressure signal in comparator 7. A switch 9a is illustrated as applying power to the circuit of FIG. 2 from a +V voltage source. When switch 9a is closed, as could occur when the internal combustion engine is first energized, switch 9a being ganged to the internal combustion engine ignition switch, a one shot 9 is triggered to generate a relatively short pulse, hereinafter termed the initial turn-on signal. The initial turn-on signal is applied to comparator 7, it being understood that in the absence of the initial turn-on signal the output 7a of comparator 7 comprises an open circuit. However, during the presence of the initial turn-on signal comparator 7 considers the signals at terminals 14a and 18a and generates a signal which is applied via line 7a to the control circuit 8. The signal on line 7a is of such sense as to cause the control circuit 8 to activate the means represented by switch 3 to cause the signal at terminal 18a to approach and equal the signal at terminal 14a. As previously mentioned, at the termination of the initial turn-on signal line 7a becomes open-circuited. This condition holds the signal at terminal 4a and represented at switch 3 by switch arm 3d making contact with contact 3b. Thereafter, during operation of the internal combustion engine, upon switch-over of the differential pressure switch 16 of FIG. 1, which switch-over causes a switch-over signal to be applied at terminal 16c, control circuit 8 is energized to consider the signal from comparator 6 which is applied via line 6a. Comparator 6, operating through control circuit 8 and the device represented by switch 3 operates to cause the signal at terminal 4a to approach and eventually be equal to the signal at terminal 14a. Upon this latter occurrence control circuit 8 in response to the signal at line 6a and operating through the device represented at 3 causes the ramp generation to cease so that the signal level at terminal 4a is held until the next switch-over signal at terminal 16c. Offset circuit 5 applies an offset equivalent to the offset of pressure switch 16 of FIG. 1 to provide a signal related to ambient pressure at terminal 18a.

Figure 3:
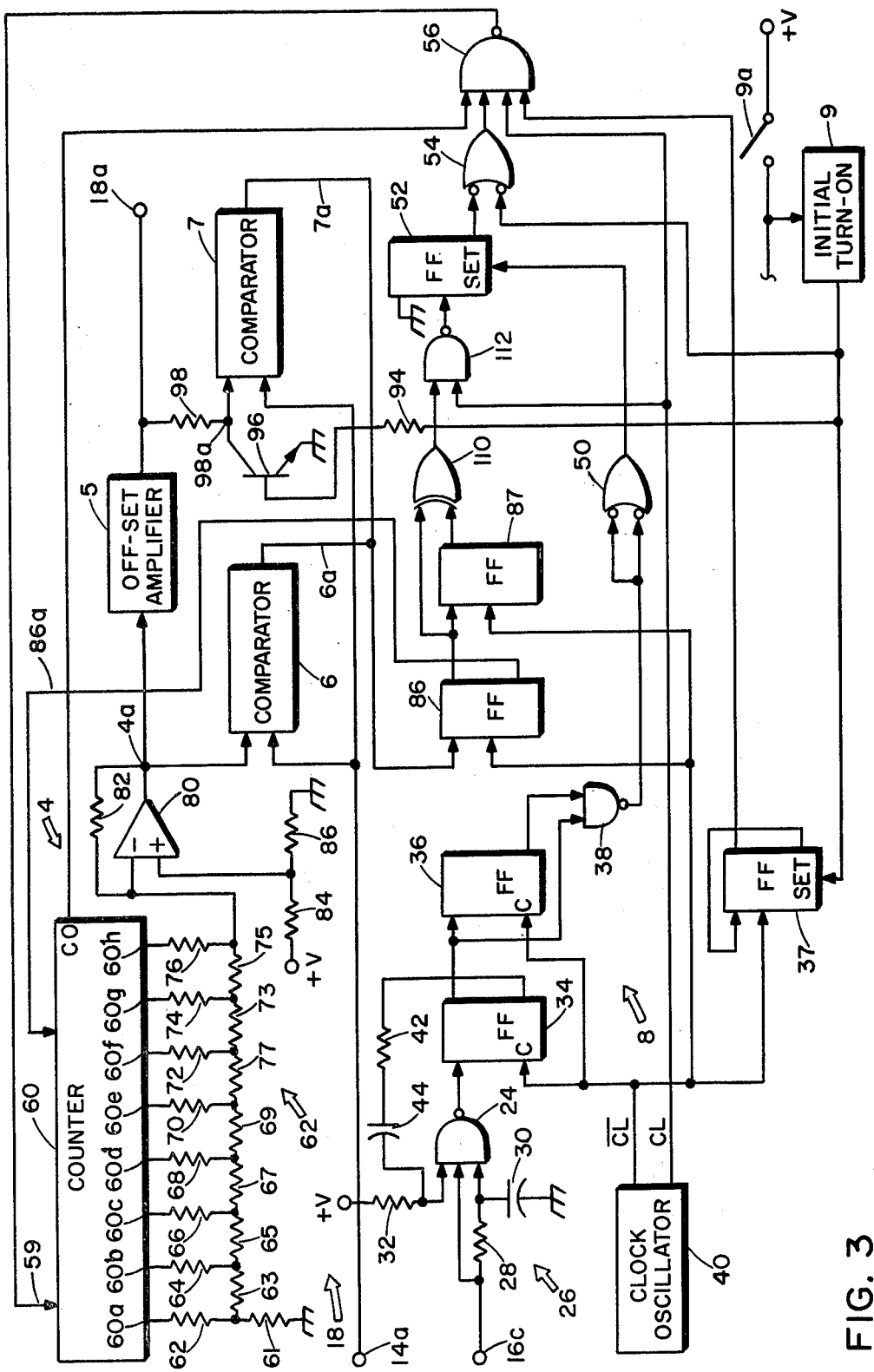
FIG. 3 is a modified block diagram showing the invention in greater detail.

Refer now to FIG. 3 which is a block diagram illustrating the invention in greater detail and as embodied using digital circuitry. Ambient pressure circuit 18 is seen to be comprised of a ramp generator 4 comprised of a digital-to-analog converter comprised in turn of a digital up-down counter 60 and a resistor network 62. In this embodiment an eight stage counter is shown, normally comprised of eight flip-flops, having output taps 60a through 60h. Counter 60 is strobed by clock pulses applied on line 59 from NAND gate 56 and initially from clock 40, through the gating means to be described as this description continues. Whether counter 60 counts up or down depends on the state of the signal on line 86a from flip-flop 86 as will also subsequently be described. The resistor network 62 as comprised of resistors 61 through 76, the odd-numbered resistors being serially connected between a common terminal, here ground, and the inverting input terminal of an operation amplifier 80 which has a resistor or connected between its inverting input terminal and its output terminal 4a, which latter terminal is also shown in FIG. 2. Operational amplifier 80 non-inverting input terminal is referenced to a fixed voltage terminal at the common junction of the voltage divider comprised of resistors 84 and 86 which are connected across a voltage source.

The even numbered resistors comprising resistor network 62 are connected, in order, between the various counter output taps 60a through 60h to the nodes of the serial string of resistors. In this embodiment the resistance of each even-numbered resistor and odd-numbered resistor 61 is twice the resistance of the other odd numbered resistors comprising resistor network 62.

Counter 60 counts in the conventional manner in this embodiment in response to the clock pulses applied thereto. Thus, being an eight stage counter there are 256 different digital codes that can be generated at the output taps 60a through 60h thereof. Resistor network 62 converts these digital codes to a rising or falling staircase ramp, depending on the direction in which counter 60 is counting, at the inverting input terminal of operational amplifier 80. The same ramp as scaled by amplifier 80 is the aforementioned ramping voltage at terminal 4a. Operational amplifier 80 also offsets the digital-to-analog converter so that the dynamic range of the digital-to-analog converter covers only the dynamic range of the ambient pressure minus offset pressure. This permits better resolution of the ambient pressure. It can be seen that if the clocks to counter 60 are interrupted the ramp voltage level at terminal 4a will be held. Interrupting the clocks is equivalent to placing switch 3 of FIG. 2 in the neutral or center position.

The signal at terminal 4a is applied through offset means or amplifier 5 to circuit output terminal 18a and also as one input to comparator 6.

Terminal 18a is connected as one input to comparator 7 and to the collector electrode or transistor 96 through resistor 98. The second input to comparators 6 and 7 is the manifold absolute pressure signal as terminal 14a.

One shot 9, which it will be remembered generates the initial turn-on signal when circuit 18 is initially energized such as is symbolically represented by switch 9a, has its output signal connected to the base electrode of NPN transistor 96 whose emitter electrode is grounded. Normally, that is during steady-state operation of circuit 18 (no output from one shot 9) transistor 96 is conductive grounding the ambient pressure signal input to comparator 7 from terminal 18a, thus providing an open circuit at line 7a as previously mentioned. Under these steady-state conditions comparator 6 effectively compares the signal at terminal 4a against the manifold absolute pressure signal at terminal 14a to generate a signal on line 6a which is applied to control circuit 8 and particularly to the set input terminal of flip-flop 86. The set output terminal of that flip-flop is connected to the set input terminal of flip-flop 87 and also as one input to Exclusive OR gate 110 whose other input is received from the set output terminal of flip-flop 87. The reset output terminal of flip-flop 86 is connected to counter 60 up-down control terminal 59a and determines the direction in which the counter will count in response to clocks on line 59. Flip-flops 86 and 87 are clocked by the clocks ($\overline{CL}$) from clock oscillator 40, which clock oscillator is basically a part of ramp generator 4 of FIG. 2.

Pressure switch 16 (of FIG. 1) switch-over signals at terminal 16c are applied directly as one input to NAND gate 24 and through the charge storage circuit 26 comprised of series resistor 28 and shunt capacitor 30 as a second input to NAND gate 24. The function of charge storage circuit 26 is to delay actuation of NAND gate for some short time period during which a switch-over signal has been applied thereto so as to eliminate false switch-overs caused by noise such as contact bounce from activating the system. The direct connection to NAND gate 24 ensures that the switch-over signal is still present when charge storage circuit 26 is effective. A third input to NAND gate 24 is normally from the +V voltage terminal through resistor 32. More below will be said about this input.

The output terminal of NAND gate 24 is connected to the set input terminal of flip-flop 34. The set output terminal of flip-flop 34 is connected to the set input terminal of flip-flop 36 and to NAND gate 38 and its reset output terminal is connected through the feedback circuit comprised of resistor 42 and capacitor 44 to the +V input of NAND gate 32. The reset output terminal of flip-flop 36 is connected to NAND gate 38. Flip-flops 34 and 36 are clocked by clocks ($\overline{CL}$) from clock oscillator 40.

At a switch-over of pressure switch 16 (FIG. 1) NAND gate 24 generates an output. At the next clock from oscillator 40 NAND gate 38 is caused to generate a signal indicating the occurrence of a switch-over. The subsequent clock pulse returns the circuit comprised of flip-flop 34 and 36 to its initial condition and holds it there for some short time period determined by the feedback circuit comprised of resistor 42 and capacitor 44. This action eliminates the unsettling effects of switch bounce also.

The switch-over signals from NAND gate 38 are applied through NOR gate 50 to the set input terminal of flip-flop 52. At the next clock pulse (CL) from clock oscillator 48 via NAND gate 112 the reset output signal from flip-flop 52 is applied through NOR gate 54 to NAND gate 56 to thus allow the clock pulses ($\overline{CL}$) to pass therethrough to counter 60 via line 59.

Of course, at the same time comparator 6 has been comparing the signals at terminals 4a and 14a and generating an output signal in accordance therewith which, acting through flip-flop 86, as previously described, has generated a signal on line 86a which controls the direction in which counter 60 will count and in particular, directs the counter in the direction to make the signal at terminals 4a and 14a equal in this embodiment. As these signals become equal the signal from comparator 6 changes state and, acting through the latch comprised of flip-flops 86 and 87, Exclusive OR gate 110, NAND gate 112, flip-flop 52 and NOR gate 54 causes gate 56 to close so that clock pulses to counter 60 are interrupted until the next switch-over signal. Offset amplifier 5 applies the above-mentioned offset to the resulting signal at terminal 4a so that a signal proportional to ambient pressure is generated and held at terminal 18a.

At initial turn-on of circuit 18, that is when one shot 9 is generating the initial turn-on signal or pulse, which in this embodiment is a negative-going pulse, the initial turn-on pulse is applied through NOR gate 54 to NAND gate 56 and through the action of flip-flop 57 to qualify NAND gate 56 so that the clock pulses (CL) on line 56a pass therethrough to strobe counter 60. The initial turn-on pulse also is applied through resistor 94 to the base electrode of transistor 96, thus opening the collector emitter circuit of that transistor to remove the ground from comparator 7 input terminal 98a. That comparator now compares the ambient pressure signal at terminal 18a, as applied through resistor 98, against the manifold absolute pressure signal at terminal 14a, as applied through resistor 102. The resultant output signal from comparator 7 on line 7a, like the signal from comparator 6 previously described, determines the direction in which counter 60 will count, the signal on line 7a being effectively applied to the counter through flip-flop 86. The signal from comparator 7 on line 7a is of such magnitude as to "swamp" any signal from comparator 6 so the comparator 6 is effectively removed from the circuit during the time the initial turn-on signal is being generated. Thus the signal at terminal 18a rapidly becomes equal to the manifold absolute pressure signal, as is valid during initial turn-on before the engine has been started and the manifold absolute pressure drops to its operating range. At the conclusion of the initial turn-on signal transistor 96 once again becomes conductive, thus grounding comparator input terminal 98a so as to disable comparator 7 and open circuit line 7a as previously mentioned. The steady-state conditions of the earlier description are thus attained.

In a circuit actually built the clock oscillator 40 frequency 0.5 MHz. This frequency permitted the counter to change much faster than the manifold absolute pressure signal could change so to permit unambiguous values of ambient pressure to be determined.

Having described this embodiment of my invention, various alterations and modifications thereof should now be obvious to one skilled in the art. Accordingly, I claim as my property such subject matter encompassed by the true scope and spirit of the appended claims.

The invention claimed is:

1. Pressure sensor means including a single pressure transducer for generating signals relating to pressures at at least first and second regions, wherein said pressure transducer is located to sense directly the pressure at said first region, comprising:

an offset differential pressure means responsive to the pressures at said first and second regions for generating a first signal when the pressure at said first region is a predetermined offset from the pressure at said second region;

means for generating a ramping signal, the direction of ramp being determined by a second signal;

first means responsive to said first signal for comparing said ramping signal against the signal generated by said pressure transducer, the results of the comparison comprising said second signal; and, means applying an offset signal equivalent to said differential pressure switch predetermined offset for generating an output signal, said output signal thereby being related to the pressure at said second region.

2. Pressure sensor means as recited in claim 1 wherein said pressure sensor means is initially energizable and wherein the pressure at said first region is generally equal to the pressure at said second region when said pressure sensor means is initially energized, said pressure means additionally comprising:

means responsive to initial energizing of said pressure sensor means for generating an initial turn-on signal; and second means responsive to said initial turn-on signal for comparing said output signal against the signal generated by said pressure transducer, the results of said comparison comprising a third signal, the direction of ramp of the signal generated by said means for generating a ramping signal being determined by said third signal while said third signal is being generated.

3. The pressure sensor means of claim 2 wherein said means for generating an initial turn-on signal comprises means for generating a relatively short turn-on signal and wherein said means responsive to said turn-on signal comprises means for extinguishing said third signal upon termination of said initial turn-on signal.

4. The pressure sensor means of claims 1, 2 or 3 wherein said means for generating a ramping signal comprises:

an up-down counter means for generating a digital signal relating to the count contained in said counter, the direction of counts being determined by said second signal; and, means for converting said digital signal into an analog signal, said analog signal comprising said ramping signal.

5. The pressure sensor means of claim 4 wherein said up-down counter means includes a source of clock pulses for causing said counter means to count in the direction determined by said second signal.

6. The pressure sensor means of claim 4 wherein said up-down counter means includes a source of clock pulses for causing said counter means to count in the direction determined by said second signal and including means for holding said ramping signal at its instantaneous value when said second signal indicates that the pressure at said first region is within a predetermined relationship with said ramping signal.

7. Pressure sensor means as recited in claim 1 wherein said first means includes additional means delaying the response of said first means to said first signal for a short time during which said first signal is generated.

8. Pressure sensor means as recited in claims 1 or 7 wherein said first means includes means for disabling said first means for a predetermined time after it initially responds to said first signal.

9. Pressure sensor means for use in an internal combustion engine having a fuel injection system for generating an electrical signal proportional to manifold absolute pressure and ambient pressure and including a pressure transducer for generating a signal proportional to manifold absolute pressure, comprising:

an offset differential pressure means responsive to said manifold absolute pressure and said ambient pressure for generating a first signal when the manifold absolute pressure is a predetermined offset from said ambient pressure;

means for generating a ramping signal, the direction of ramp being determined by a second signal;

first means responsive to said first signal for comparing said ramping signal against said signal proportional to manifold absolute pressure, the results of the comparison comprising said second signal; and, means applying an offset signal equivalent to said differential pressure means predetermined offset for generating an output signal, said output signal thereby comprising said signal proportional to ambient pressure.

10. The pressure sensor means of claim 9 where-in said manifold absolute pressure is generally equal to said ambient pressure upon initial turn-on of said internal combustion engine, said pressure sensor means additionally comprising:

means responsive to initial turn-on of said internal combustion engine for generating an initial turn-on signal;

second means responsive to said initial turn-on signal for comparing said output signal against the signal proportional to the manifold absolute pressure, the results of said comparison comprising a third signal, the direction of ramp of the signal generated by said means for generating a ramping signal being determined by said third signal while said third signal is being generated.

11. The pressure sensor means of claim 10 wherein said means for generating an initial turn-on signal comprises a one shot which generates a relatively short turn-on signal and wherein said means responsive to said initial turn-on signal comprises means for extinguishing said third signal upon termination of said initial turn-on signal.

12. The pressure sensor means of claims 9, 10, or 11 wherein said means for generating a ramping signal comprises:

an up-down counter means for generating a digital signal relating to the count contained in said counter, the direction of count being determined by said second signal; and, means for converting said digital signal into an analog signal, said analog signal comprising said ramping signal.

13. The pressure sensor means of claim 12 wherein said up-down counter means includes a source of clock pulses for causing said counter means to count in the direction determined by said second signal.

14. The pressure sensor means of claim 12 wherein said up-down counter means includes a source of clock pulses for causing said counter means to count in the direction determined by said second signal and including means for holding said ramping signal at its instantaneous value when said second signal indicates that the manifold absolute pressure is within a predetermined relationship with said ramping signal.

* * * * *